United States Patent [19]

Franco

[11] Patent Number: 5,310,991
[45] Date of Patent: May 10, 1994

[54] MACHINE TOOL, IN PARTICULAR A LASER MACHINE, WITH AN OPERATING HEAD SUPPORTED BY A CANTILEVER BEAM

[75] Inventor: Sartorio Franco, Turin, Italy

[73] Assignee: Prima Industrie S.p.A., Turin, Italy

[21] Appl. No.: 982,994

[22] Filed: Nov. 30, 1992

[30] Foreign Application Priority Data

Jan. 27, 1992 [IT] Italy .................. TO92A000053

[51] Int. Cl.⁵ .............................. B23K 26/08
[52] U.S. Cl. .................................. 219/121.78
[58] Field of Search .................. 219/121.78, 121.79, 219/121.8, 121.81, 124.22

[56] References Cited

U.S. PATENT DOCUMENTS

| | | | |
|---|---|---|---|
| 4,223,201 | 9/1980 | Peters et al. | 219/121.63 |
| 4,967,053 | 10/1990 | Aharon | 219/121.78 |
| 5,053,602 | 10/1991 | Aharon | 219/121.78 |

FOREIGN PATENT DOCUMENTS

| | | | |
|---|---|---|---|
| 3410919 | 4/1985 | Fed. Rep. of Germany . | |
| 0020667 | 1/1986 | Japan | 219/124.22 |
| 1186031 | 4/1970 | United Kingdom . | |
| 2153785 | 8/1985 | United Kingdom | 219/121.78 |

*Primary Examiner*—C. L. Albritton
*Attorney, Agent, or Firm*—Dominik, Stein, Saccocio, Colitz & Van DerWall

[57] ABSTRACT

A cartesian-type machine tool, particularly but not exclusively a laser machine, includes an operating head disposed at the end of a main beam which is cantilevered on a fixed support structure and is movable, relative to the fixed structure, in the direction of its own longitudinal axis. A considerable part of the weight of the main beam is supported by an auxiliary beam movable parallel to the main beam and cantilevered on the fixed structure, by support means which transmit the substantial part of the weight of the main beam to the auxiliary beam without rigid constraints of distance between the main beam and the auxiliary beam.

7 Claims, 7 Drawing Sheets

MACHINE TOOL, IN PARTICULAR A LASER MACHINE, WITH AN OPERATING HEAD SUPPORTED BY A CANTILEVER BEAM

The present invention relates to a cartesian-type machine tool, in particular a laser machine, including an operating head movable in at least two directions at right-angles to one another, the head being disposed at the end of a main beam which is cantilevered on a support structure and is movable relative to the support structure in the direction of its own longitudinal axis.

On machines in which the operating head is supported by a cantilever beam, bending of the free end of the beam plays a critical part as far as accuracy of the machine is concerned.

In the case of a cantilever beam which is subject only to the effect of its own weight, the camber at the free end of the beam is proportional to the fourth power of the length of the cantilevered part of the beam, and thus varies as the beam is moved along its own longitudinal axis. This variation in the camber cannot be compensated for easily, and the maximum camber permissible at the free end of the beam thus imposes relatively narrow limits on the travel of the beam in the direction of its own longitudinal axis—and thus on the dimensions of the working area of the machine—requiring the beam and the supports thereof to be dimensioned for strength, which in turn affects the cost of the machine.

A system is known from Italian patent 764,361 by the same inventor (corresponding to British patent 1,186,031) which enables deformation of the guides to be limited on machine tools and the like provided with a member which is movable along these guides. In this known system the movable member is guided along its path by a first support and is connected to a second movable member which is guided along a second support having the same general path as the first An element, for example a spring, which transmits a substantial part of the weight of the first movable member to the second movable member, without a rigid constraint of distance between the two units, is interposed between the first and second movable members Thus, the dimensions of the support of the first movable member need not take into account the weight of this member. Italian patent 764,361 also describes the application of the said system to a measuring machine having a gantry structure. This application is shown schematically in FIG. 7. In this case the first movable member is constituted by a bridge 100—on which a carriage 102 is slidable—supported at either end by a pair of beams 104 forming an integral part of the fixed structure of the machine The second movable member is constituted by an auxiliary structure 106 which supports a substantial part of the weight of the bridge 100 by means of a highly flexible resilient suspension device 108. The auxiliary structure 106 is movable along guides 110, and is connected to the bridge 100 by means of a restraining system 112 which allows the bridge 100 to move relative to the auxiliary structure 106 in a vertical direction Z.

This known solution enables the weight of the bridge 100 to be disregarded ween the dimensions of the beams 104 which support the latter are selected since most of this weight is supported by the guides 110 of the auxiliary structure which can withstand considerable deformation without affecting the accuracy of the machine. In fact, even if the distance between the auxiliary structure 106 and the bridge 110 is varied, the high level of flexibility of the resilient suspension device 108 enables the latter to support the bridge 110 with almost unvaried force.

On the basis of this known art, the aim of the present invention is to provide a machine tool having a cantilever structure of the type defined initially in the description, in which the maximum bending of the main beam is extremely low, without needing to resort to an excessive size of the main beam and of the supports thereof.

According to the invention this aim is achieved by a machine having the characteristics defined in claim 1. In the machine according to the invention, the weight of the main beam is supported mainly by an auxiliary beam movable integrally with the main beam and cantilevered on the fixed structure. This enables the dimensions of the main beam to be selected as if it were a beam supported at its ends, in other words at the points where it is supported by the auxiliary beam. Even if the auxiliary beam is supported in cantilever form, it need not be dimensioned particularly for strength since the deformation thereof has virtually no effect on the accuracy of the machine, by virtue of the fact that the main beam is connected to the auxiliary beam by support means which transmit the weight of the main beam to the auxiliary beam without rigid constraints of distance between the main beam and the auxiliary beam.

Thus, when the main beam is moved along its own longitudinal axis, and therefore the length of the cantilevered part is varied, the conditions of restraint of the main beam, which is still as if it were resting on the points of connection with the auxiliary beam, remain unchanged. Thus, the camber of the main beam is constant and can therefore easily be compensated for.

The present invention is particularly advantageous in applications in which the operating head is not subjected to a working load, such as, for example, in the case of laser machines and measuring machines, where the only load to which the main beam is subjected is its own weight and that of the parts integral therewith.

Further characteristics and advantages of the present invention will become apparent from the following detailed description given with reference to the appended drawings, in which.

Figure 7:
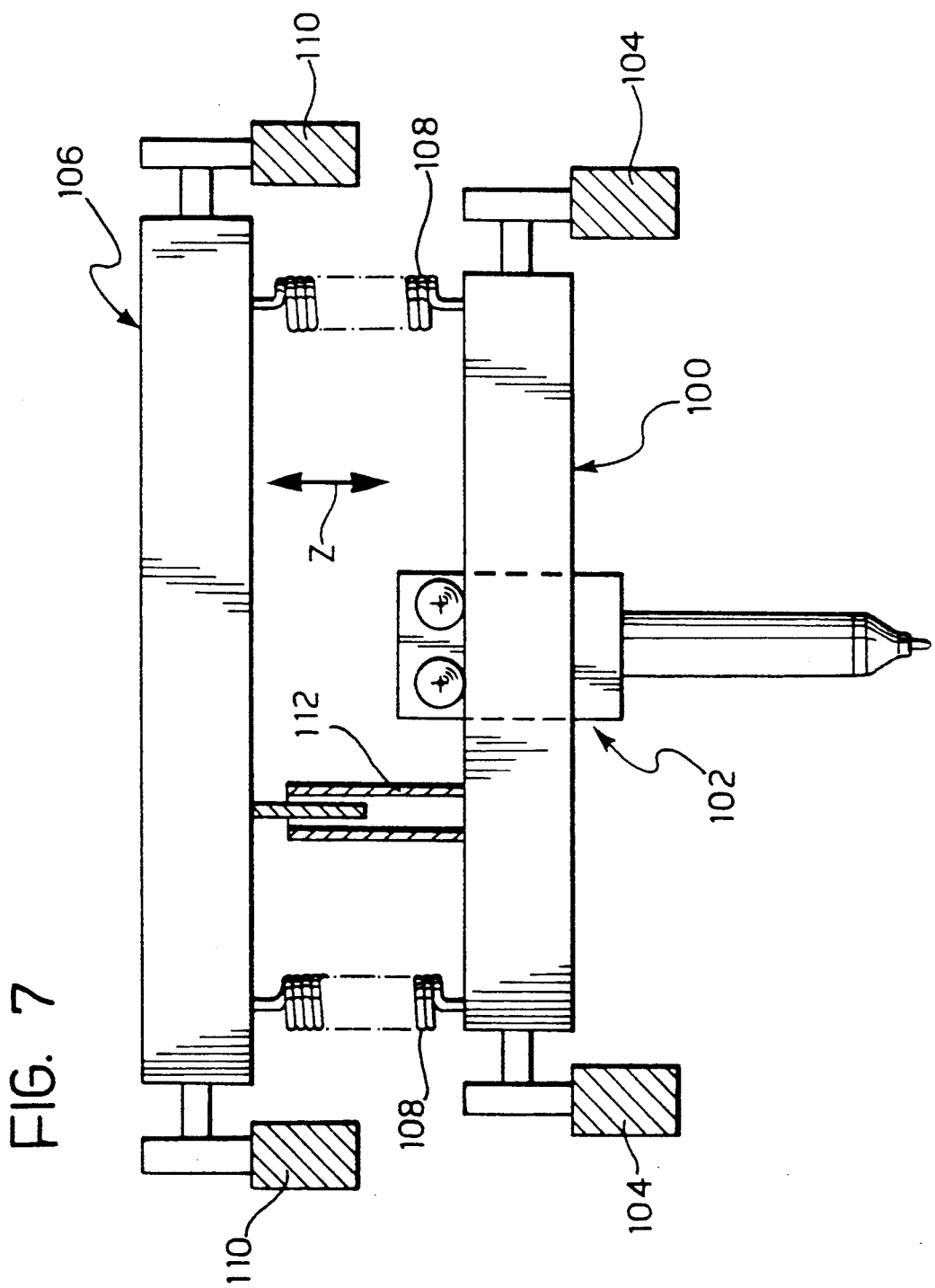

FIG. 7, previously described, is a schematic view of a known machine.

Figure 1:
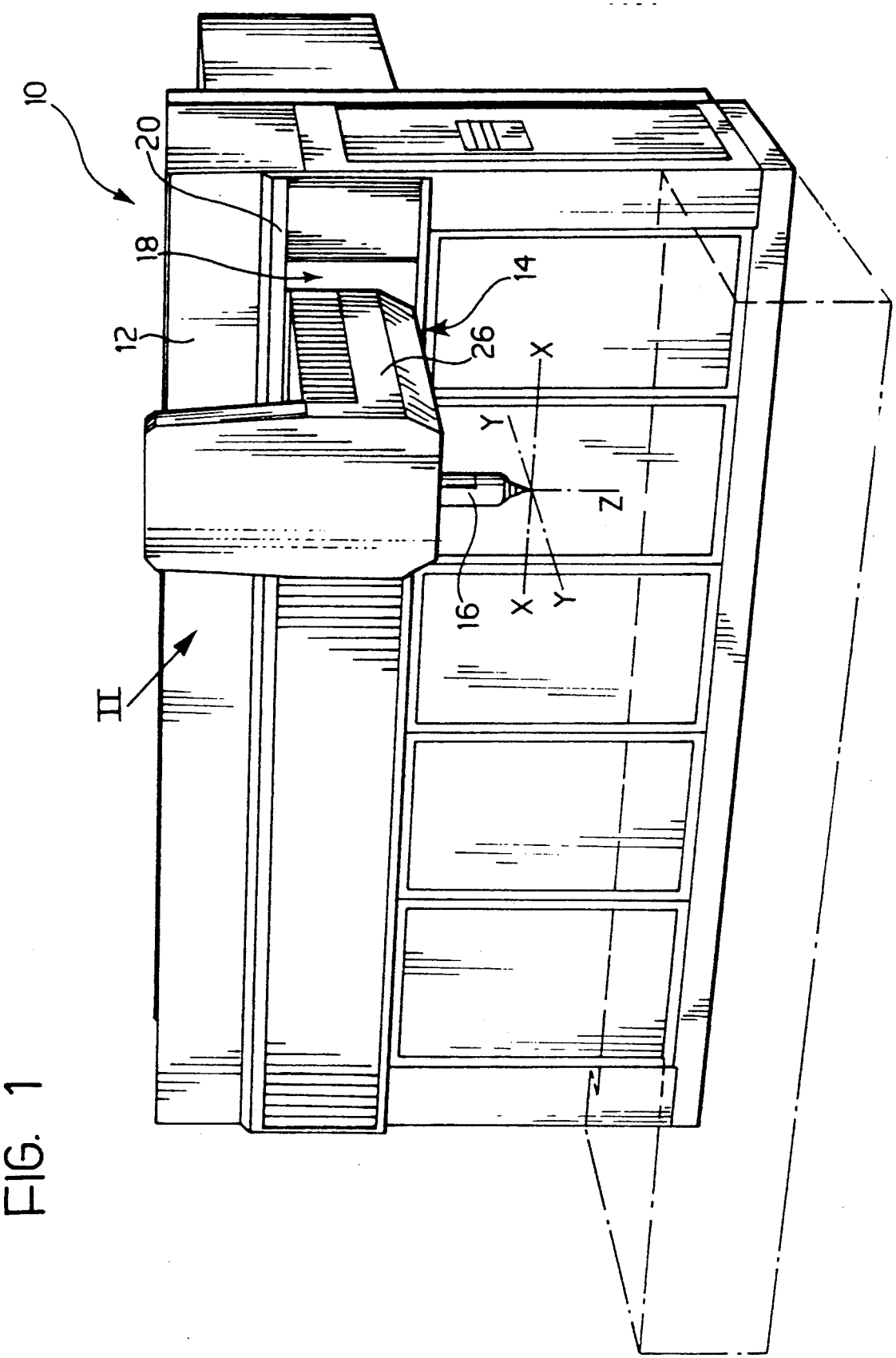
FIG. 1 is a schematic perspective view of a laser machine with a cantilever structure.
Figure 1A:
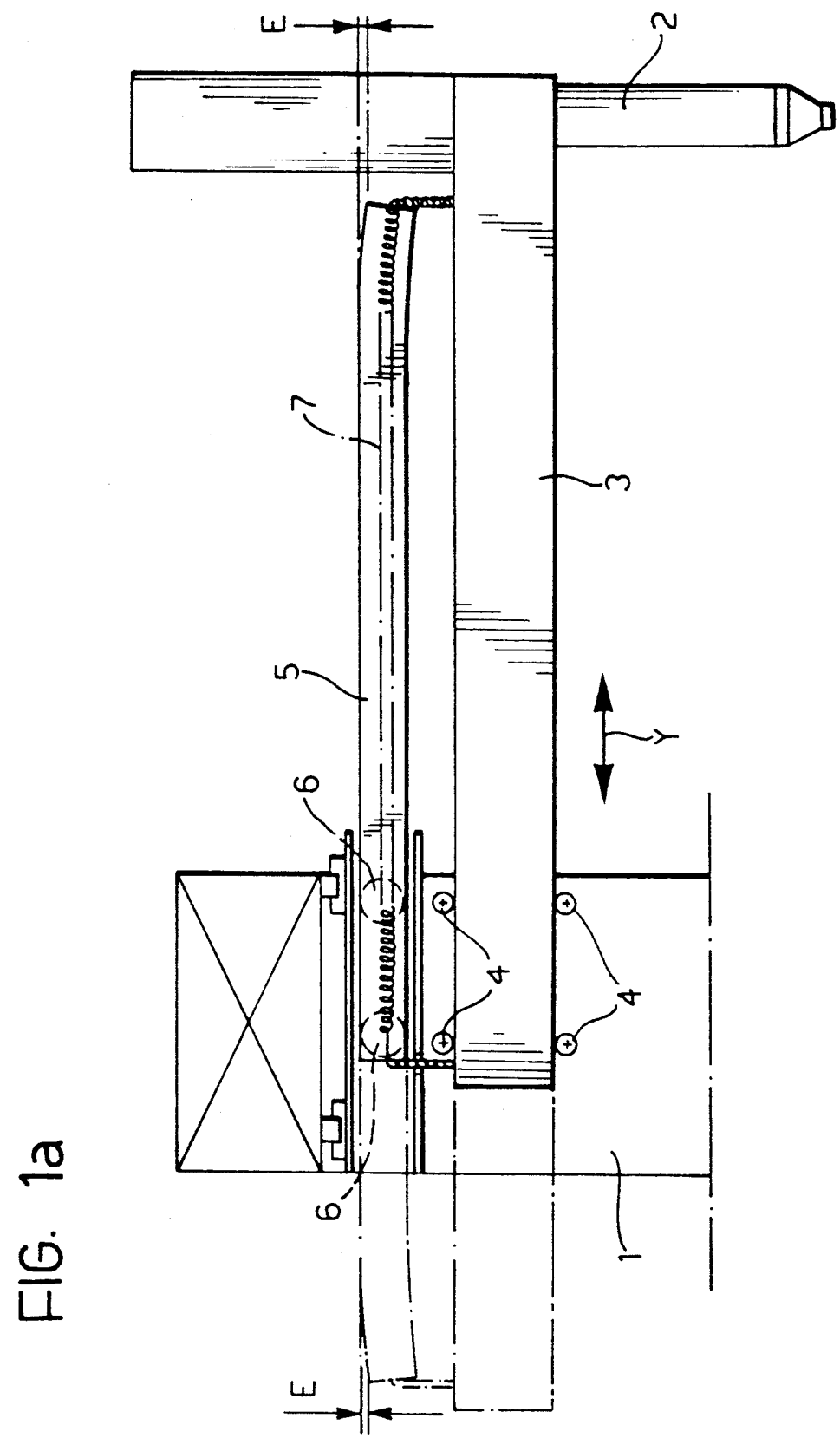
FIG. 1a is a schematic side view of a machine according to the invention.

With reference to FIG. 1a, the support structure of a machine tool equipped with a head 2 supported by a main beam, is indicated 1. The main beam 3 is cantilevered on the structure 1 by means of supports 4 which enable the main beam 3 to slide in the direction Y. An auxiliary beam, indicated 5, is cantilevered on the structure 1 by means of supports 6 and is movable parallel to the main beam 3. The auxiliary beam 5 supports a considerable part of weight of the main beam 3 by means of one or a plurality of helical springs 7. The free end of the auxiliary beam 5 is deformed by an amount E, the extent of which has been exaggerated in order to facilitate understanding of the drawing. The resilience of the spring 7 needs to be very high such that the decrease in distance between the main beam 3 and the auxiliary beam 5, owing to the bending of the latter and of the supports thereof, varies the force transmitted to the spring 7 by a negligible amount.

FIGS. 1 to 7 show an example of practical embodiment of the system according to the invention. In FIG. 1, a laser machine comprising a fixed structure 12 bearing an arm 14 movable in the horizontal direction Y is indicated 10. The arm 14 is cantilevered on the structure 12 and bears, at its free end, a laser focusing head 16 having a path in the vertical direction Z relative to the arm 14. The arm 14 is supported by a carriage 18 which slides relative to the structure 12 along guides 20 extending in the direction X.

Figure 2:
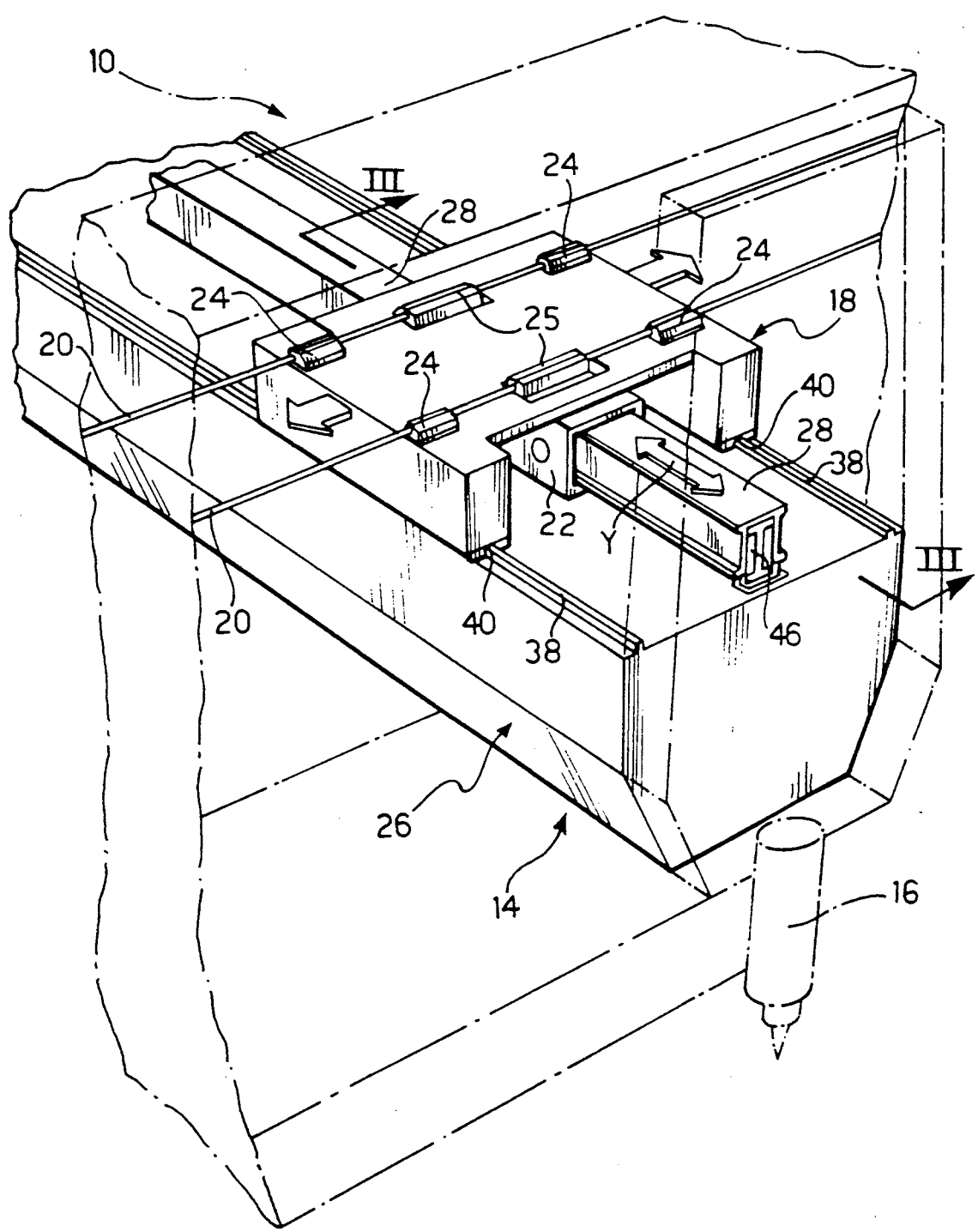
FIG. 2 is an enlarged perspective view of the part indicated by the arrow II in FIG. 1.
Figure 3:
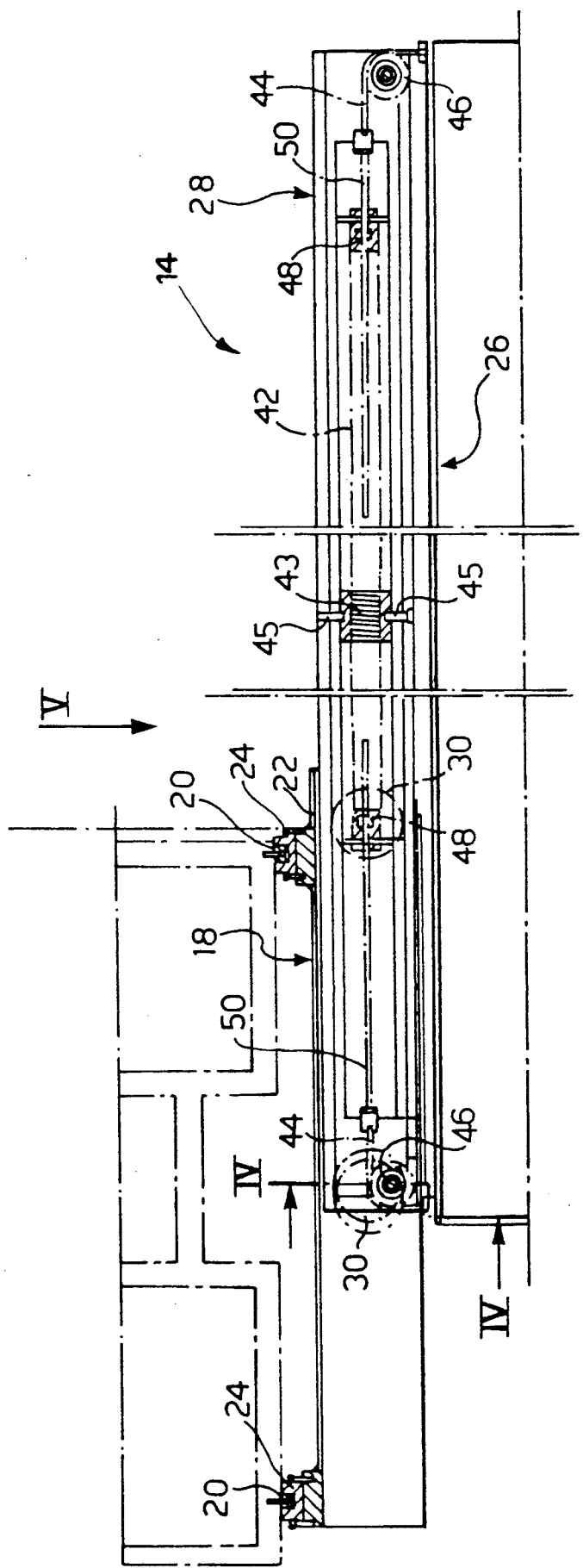
FIG. 3 is a longitudinal cross-section along line III-—III in FIG. 2.

As can be seen in greater detail in FIGS. 2 and 3, the carriage 18 slides on the guides 20 by means of recirculating-ball runners 24. A tubular element 22 slides on the guides 20 by means of runners 25, and is connected to the carriage 18 by means of a restraining system (not shown) which joins together the element 22 and the carriage 18 for movements in the direction X.

Again with reference to FIGS. 2 and 3, the arm 14 includes a main beam 26 which supports the head 16, and an auxiliary beam 28 which supports a substantial part of the weight of the main beam 26.

Figure 4:
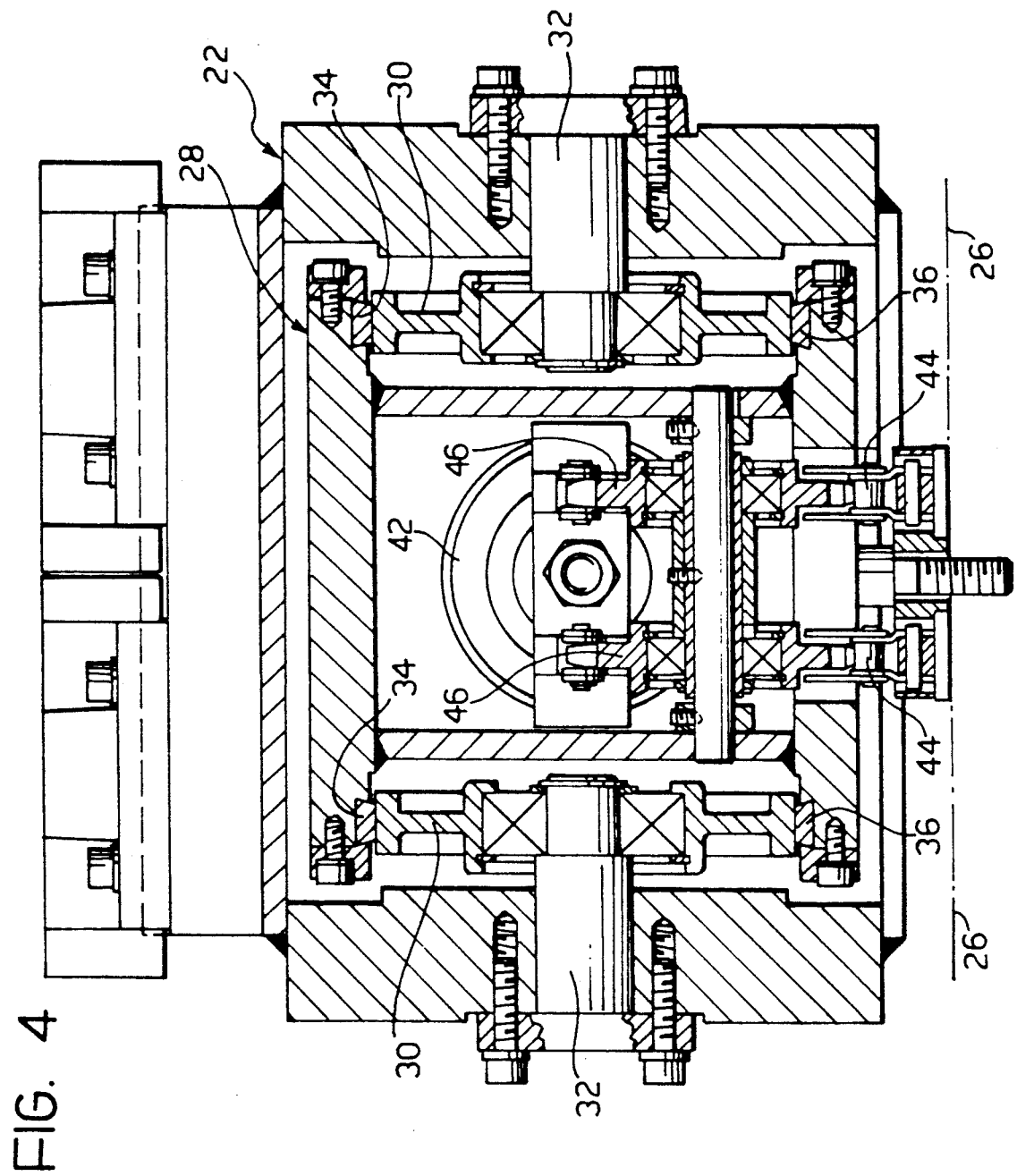
FIG. 4 is a transverse cross-section along line IV—IV in FIG. 3.

The auxiliary beam 28 extends inside the tubular element 22 and is cantilevered on the latter. The auxiliary beam 28 is mounted in a sliding manner in the direction Y relative to the tubular element by means of a series of wheels 30 (FIGS. 3 and 4). As can be seen in FIG. 4, each wheel 30 idles on a pin 32 attached to the tubular structure 22, and is kept in rolling contact with an upper 34 or lower 36 guide.

With particular reference to FIG. 2, the main beam 26 is connected to the carriage 18 by means of guides 38 and recirculating-ball runners 40, the function of which is substantially to guide the main beam 26 in the direction Y. In fact, as has already been described, the weight-supporting function of the main beam 26 is fulfilled mainly by the auxiliary beam 28; the dimensions of the runners 40 of the carriage 18 are such that the carriage only supports a small proportion of the weight of the main beam 26 and of the parts attached thereto.

The main beam 26 is connected to the guides 20 by means of the carriage 18, which, as already stated, slides along the guides 20 by means of the runners 24. The auxiliary beam 28 on the other hand is connected to the guides 20 by means of the tubular element 22, which is mounted in such manner that it slides on the guides 20 by means of its own runners 25, which are independent of the carriage 18. Thus, the main beam 26 is not affected in any way by the deformations caused by the loads acting on the auxiliary beam 28, since the carriage 18 and the runners 24 only serve to guide the main beam 26, whereas the weight of the latter is supported by the runners 25 and by the tubular element 24, by means of the auxiliary beam 28.

The auxiliary beam 28 supports the main beam 26 by support means which can transmit the main part of the weight of the main beam 26 to the auxiliary beam 28 without a rigid constraint of distance between the main beam 26 and the auxiliary beam 28.

In the example illustrated in the drawings, these support means take the form of a drawn helical spring 42 (FIG. 3) extending inside the auxiliary beam 28, in the direction of the axis Y. Each end of the spring 42 is connected to one end of the main beam 26 by means of a pair of chains 44 adjacent one another (see also FIG. 4). The spring 42 is joined integrally with the auxiliary beam 28 by means of a bush 43 (FIG. 3) which clamps the central part of the spring 42 and which is attached to the auxiliary beam 28 by means of pins 45. The spring 42 is thus divided into two sections, each of which acts as an independent spring. The chains 44 cooperate with respective return wheels 46 supported in a freely-rotatable manner at one end of the auxiliary beam 28. Each end of the spring 42 is attached to a connection element 48 which has a threaded hole engaged by a threaded rod 50 connected to a pair of chains 44. The threaded couplings between the rods 50 and the connection elements 48 enable preloading of the two sections of the spring 42, and thus the horizontality of the main beam 26 to be regulated.

The main beam 26 is supported at either end by the force which stresses the spring 42, and acts to all intents as if it were a supported beam rather than a cantilevered beam The auxiliary beam 28 is deflected significantly under the weight of the main beam; however, the deflection of the auxiliary beam 28 does not affect substantially the ability of the spring 42 to support the load produced by the weight of the main beam 26. The greater the flexibility of the spring 42, the lesser the effect of the bending of the auxiliary beam 28 on the support force of the spring 42. This gives rise to the need for a very long (and therefore very flexible) spring 42 extending along almost the entire length of the auxiliary beam 28.

The high level of flexibility of the spring 42 ensures that the system is stable in the long term; any minor movement or deformation of the auxiliary beam 28 or of the support system (chains 44, tension rod 50, spring 42, bush 43 etc.) has a negligible effect on the support force exerted on the main beam 26.

Figure 6:
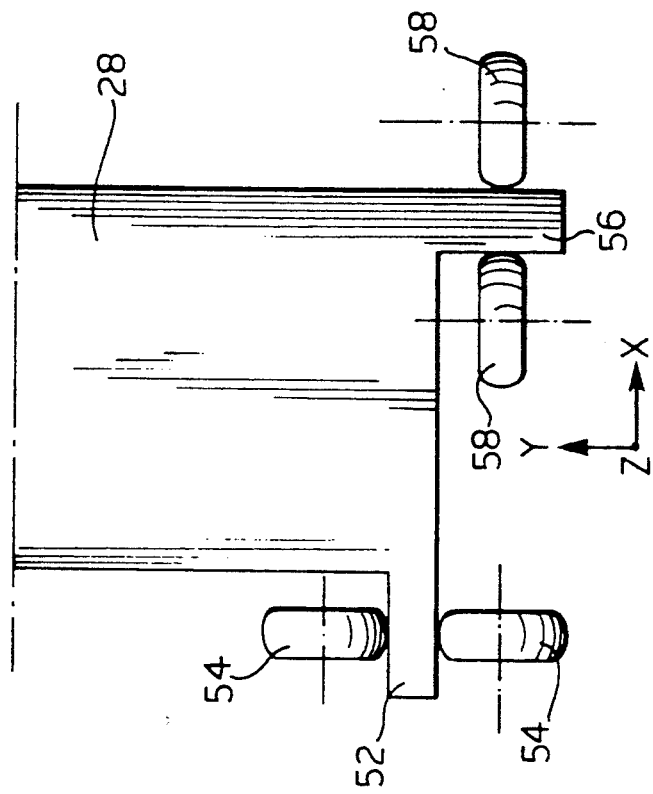
FIG. 6 is an enlarged detail along arrow VI in FIG. 5.
Figure 5:
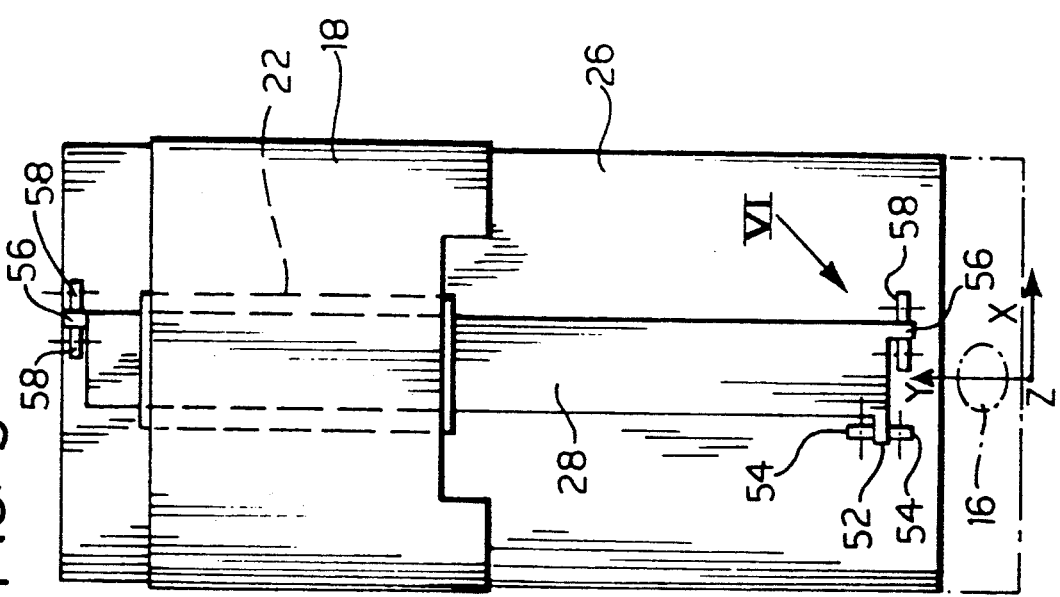
FIG. 5 is a schematic view along arrow V in FIG. 3.

The main beam 26 and the auxiliary beam 28 are also connected to one another by means of a restraining system which permits complete freedom of relative movement in the direction Z, and which forms a rigid restraint for movements in the directions X and Y. FIGS. 5 and 6 show schematically a form of embodiment of such a restraining system. Restraint in the direction Y is obtained by means of a guide 52 in the plane X-Z, supported by the auxiliary beam 28. Two opposed wheels 54 supported by the main beam 26 act against the guide 52. Similarly, restraint in the direction X is achieved by means of guides 56 in the plane Y-Z, cooperating with opposed wheels 58.

What is claimed is:

1. A cartesian-type machine tool, particularly but not exclusively a laser machine, including a support structure, a main beam which is cantilevered on the support structure and is movable relative to the support structure in the direction of its own longitudinal axis, and an operating head disposed at the end of the main beam and movable in at least two directions at right-angles to one another, wherein it also includes an auxiliary beam which is movable parallel with the main beam and is cantilevered on the support structure, and support means through which the auxiliary beam supports a considerable part of the weight of the main beam and of the operating head and which can transmit the main part of the weight of the main beam to the auxiliary beam without rigid constraints of distance between the main beam and the auxiliary beam.

2. A machine tool according to claim 1, wherein it includes a restraining system which interconnects the main beam and the auxiliary beam, the restraining system permitting relative freedom of movement in a vertical direction but forming a rigid restraint for movements in a horizontal plane.

3. A machine tool according to claim 1, wherein the support means include at least one helical spring attached at its ends to the main beam and having a particularly high level of flexibility such as to make the load variation negligible in comparison with the total weight supported, this variation being caused by varying the distance between the ends of the auxiliary beam and the corresponding attachment points of the ends of the spring to the main beam.

4. A machine tool according to claim 3, wherein the helical spring extends parallel to the longitudinal direction of the main beam and is accommodated inside one of said auxiliary beam and said main beam.

5. A machine tool according to claim 3, wherein it includes a device which is of adjustable length and connects at least one of the ends of the spring to the main beam.

6. A machine tool according to claim 3, wherein it includes a flexible connection unit to which at least one end of the helical spring is connected in series, and a return wheel with which the said unit cooperates.

7. A machine tool according to claim 1, including horizontal guides disposed at right angles to the longitudinal axis of the main beam, a carriage which slidably supports the main beam and is movable along said guides, and runner units which are independent of said carriage and by means of which the auxiliary beam is movable along said guides.

* * * * *